June 10, 1930.  C. H. DESAUTELS  1,762,856
TURN-UNDER STITCHING DEVICE
Filed May 11, 1929  3 Sheets-Sheet 1

INVENTOR.
Charles H. Desautels.
BY
ATTORNEY.

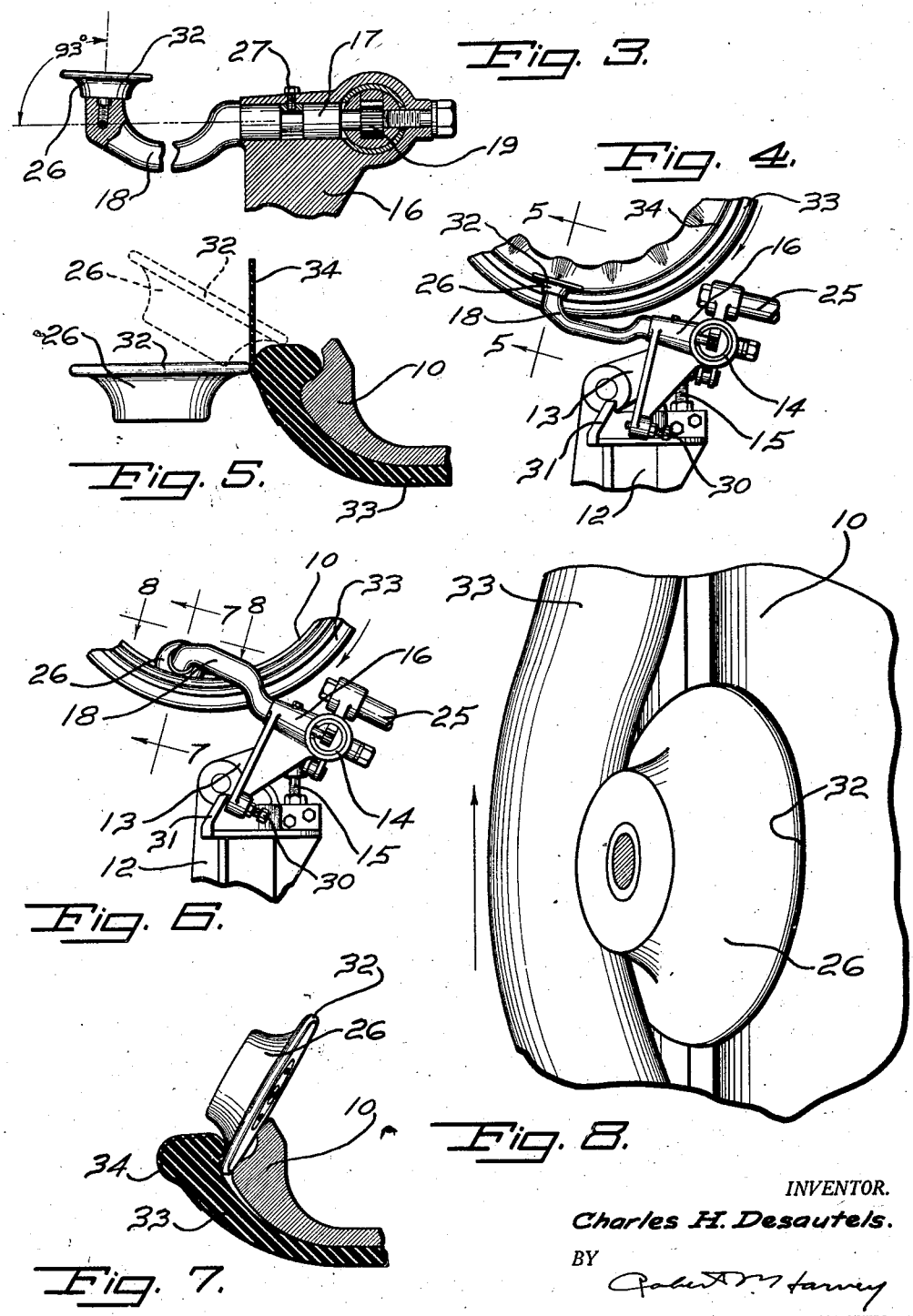

INVENTOR.
Charles H. Desautels.
BY
ATTORNEY.

Patented June 10, 1930

1,762,856

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TURN-UNDER STITCHING DEVICE

Application filed May 11, 1929. Serial No. 362,275.

My invention relates to tire building apparatus and more particularly to a stitching device which constitutes an improvement of the stitching device shown in William F. Irrgang's pending application, Serial Number 196,796, filed June 6, 1927, Patent Number 1,716,585, June 11, 1929.

One object of my invention is to provide a stitching device that will stitch around and under the beads certain of the carcass plies, chafing strip, etc., and at the same time break the carcass from the building drum. Another object is to provide a stitcher of such character that will work equally well on double as well as single bead tires. Still further objects will be apparent from the following specification and claims. In the drawings which illustrate one embodiment of my invention, Fig. 1 is a side view of a tire building machine equipped with stitchers constructed according to my invention;

Fig. 3 is a sectional view taken on the line 3—3 of Fig. 2;

Fig. 4 is a partial side view similar to Fig. 1, showing the position of parts at the start of the stitching operation;

Fig. 5 is a view taken on the line 5—5 of Fig. 4;

Fig. 6 is a view similar to Fig. 4, showing the position of parts at the end of the stitching operation;

Figure 1:
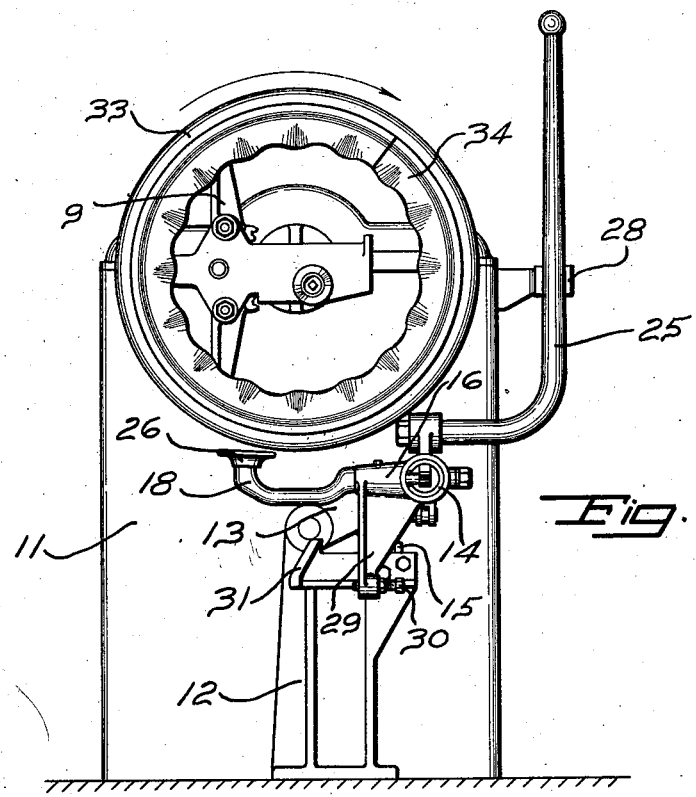
Figure 2:
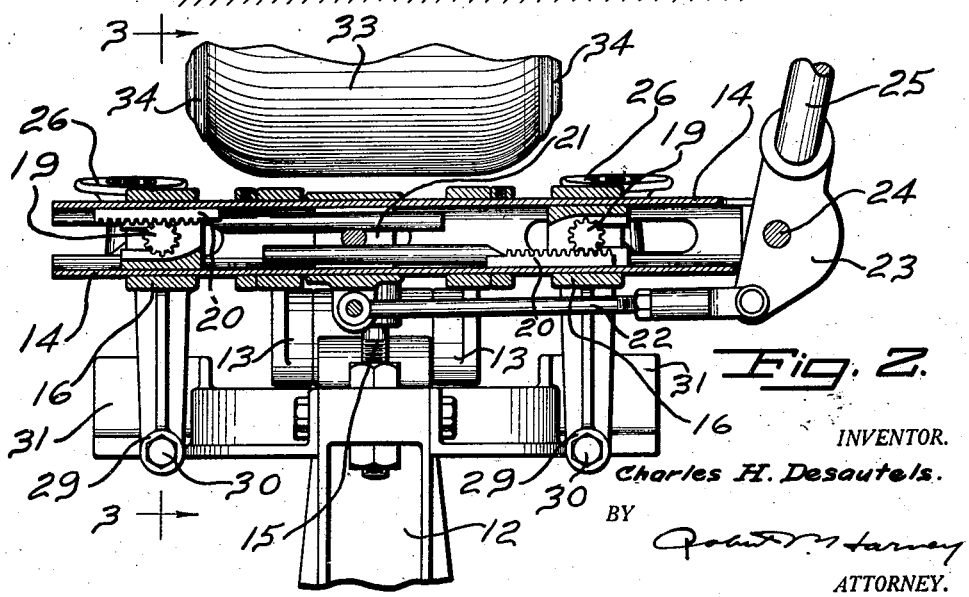
Fig. 2 is a partial front view of the machine shown in Fig. 1, partly in section and on a larger scale.

Figs. 7 and 8 are views taken, respectively, on the lines 7—7 and 8—8 of Fig. 6; and Figs. 9 to 14 are diagrammatic views showing roll movements.

In the building of tire carcasses on a semi-flat building drum, that is a drum arched adjacent the beads, one of the problems from a mass production viewpoint is to provide a simple stitching apparatus that will accomplish quickly and easily the turning under of certain of the carcass plies, chafing strips, etc., around and under the bead. The advent of the semi-flat or crowned type building drums has made possible the manufacture of larger multibead tires by this method, thus a stitching device of the character previously mentioned should be universal to all sizes, that is it should be able to perform the stitching operation equally as well on all the different size carcasses regardless of the size and contour of the drum or whether the carcass is a single or multibead size.

My invention successfully meets all the previously mentioned requirements and in addition it has certain other advantages. In the drawings a tire building drum as indicated at 10 is supported by means of a collapsible chuck 9 and a housing 11 in which is housed suitable driving mechanism for rotating the drum in the direction of the arrow in Fig. 1. My invention as embodied in the drawings comprises stitching rolls 26 mounted on offset arms 18 and I have shown these latter attached to a suitable apparatus which will impart to them the desired movements to accomplish the stitching operation.

A standard 12 is mounted substantially as shown in relation to the building drum 10 and pivotally supports arms 13 which in turn serve to adjustably position, by the use of adjusting bolt 15, a hollow shaft 14 so that the latter is free to be rotated. Bushings 16 adjustably secured to the hollow shaft 14 are formed to receive the round shank portions 17 of offset arms 18 and, as best shown in Fig. 3, a thrust collar arrangement 27 may be used to assume the load and wear of the parts. Pinions 19 formed on the end of the round shank portions 17 engage racks 20 which are adjustably secured to a common split collar arrangement 21 adapted to slide on the hollow shaft 14. A link 22 connects the split collar arrangement 21 to one arm of a lever 23 which is positioned in a slot in the hollow shaft 14 and pivoted to the latter at 24. The other arm of the lever 23 is adapted to receive a handle 25 which, when the apparatus is in inoperative position, is held by a member 28 attached to the housing 11. It will be evident from the foregoing that the handle 25 is free to move in two planes, one at right angles to the surface of the building drum and the other parallel to the surface and that these movements will respectively pivot the offset arms 18 toward and from the drum and also rotate them in opposite directions and that these two movements may be affected simultaneously. As shown in Figs. 1, 4 and 6, the bushings 16 are formed with extended portions 29 in which are secured adjustable stops 30 adapted to engage abutments 31 bolted to the standard 12, thus limiting the degree of pivoting of the offset arms 18 toward the drum 10.

As best shown in Fig. 3, the stitching rolls 26 are mounted on the arms 18 so that their axes will make an angle of approximately 93° with the axes of the round shank portions 17 of the arms 18. This is an important feature of my invention and its advantage will readily be seen in the following paragraph.

In the drawings I have shown a partially built tire carcass 33, the bead portion of which has a contour substantially as shown in Figs. 5 and 7, and is of a double bead construction. In Fig. 1 a chafing strip 34 is shown as just applied and the operation of the apparatus to stitch it around and under the bead is as follows. The handle 25 is operated to pivot the arm 18 and stitcher rolls 26 into contact with the carcass as shown in Fig. 4. It will be noted that when the roll 26 engages the carcass the plane of the flange 32 is substantially at right angles to a radius of the drum. The operator then continues the pivoting movement and also commences the rotating movement to cause the roll 26 to follow the contour of the bead portion as indicated by the dotted line position in Fig. 5. In Figs. 6, 7 and 8 I have shown the position of parts at the end of the stitching operation, the stop 30 being against the abutment 31 and the roll 26 wedged in between the drum and the carcass forcing the latter away from the drum. Due to the previously mentioned 93° angle between the axis of the stitching roll and the axis of the arm a plane passing through the flange 32 of the roll 26, when in the position shown in Fig. 7, makes approximately a three degree angle with the shoulder of the drum. The object of this is to make the leading edge of the flange 32 tuck and stitch the chafing strip into place and leave the trailing edge of the flange out of contact with the carcass. This is advantageous as the trailing edge of the roll would tend to undo the work of the leading edge and form wrinkles. This angle is also advantageous as the carcass is thus displaced so as to introduce the chafing strip. Another advantage of displacing the carcass is that by this operation the bond between the carcass and the drum, desirable during the preceding building steps but no longer needed, is ruptured, thus the two operations of stitching the chafing strip under the bead and breaking the carcass from the drum are accomplished simultaneously.

It will be understood that both stitchers operate at the same time except in opposite directions and also that carcass elements other than the chafing strips may be stitched around the bead in the same way.

In Figs. 9 to 14 inclusive I have illustrated diagrammatically, how the compound movement of the roll enables it to stitch around bead portions of various cross-sectional dimensions and contours. Center lines 36 represent the vertical plane in which the center of rotation ($r$) of the arm 18 moves. The circular center line 37 described about the center of rotation ($r$) indicates the path of travel of the contacting point of the roll. For clearness I have indicated the center of rotation ($r$) with sub-numbers corresponding to the figure showing the position of the roll in respect to the indicated ($r$).

Figure 9:
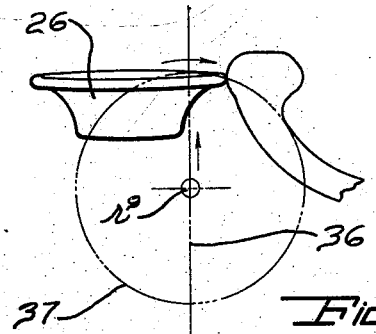
Figure 12:
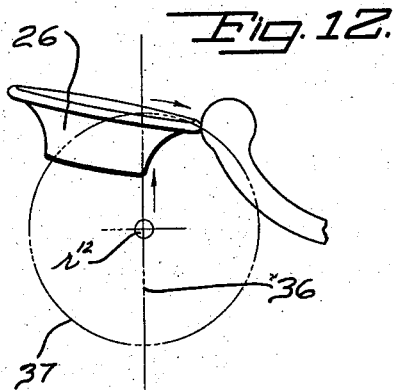
Figure 10:
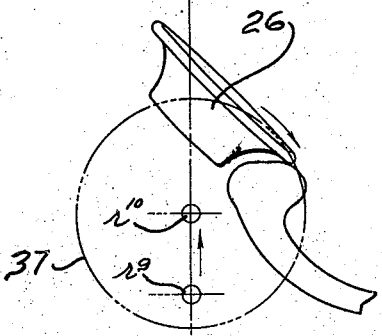
Figure 13:
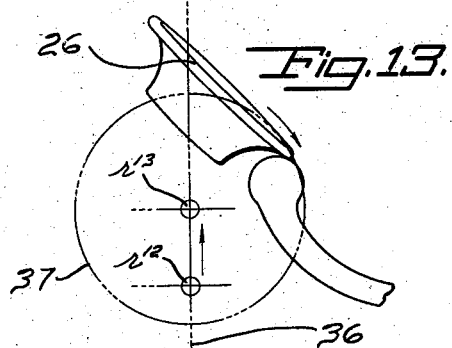
Figure 11:
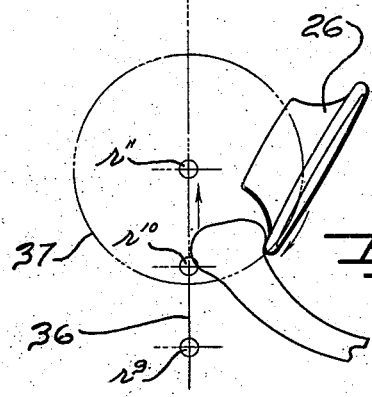
Figure 14:
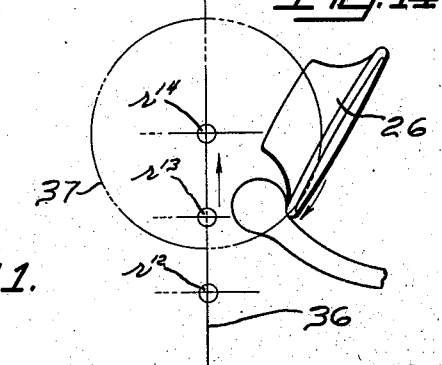

Fig. 9 shows the starting position of the roll in respect to a bead portion of a double bead type, $r^9$ showing the position of the center of rotation of the arm in the plane 36. By applying the pivoting and rotating movements in combination, as indicated by the arrows, the roll follows the contour of the bead portion with a yieldable pressure, the extent of which is determined by the operator. Fig. 10 shows an intermediate position in the stitching operation, the distance between $r^9$ and $r^{10}$ indicating the extent that the center of rotation has risen and Fig. 11 shows the stop position with $r^{11}$ indicating the highest or stop position of the center of rotation. Figs. 12, 13 and 14 show the same respective operative positions as Figs. 9, 10 and 11, but operating on a single bead type, the only difference in the roll settings being in the location and travel of the center of rotation as indicated by $r^{12}$, $r^{13}$ and $r^{14}$ and the contacting point of the roll.

From the foregoing it can be readily seen that the roll will stitch bead portions of substantially any shape provided they lie within the mechanical limitation of the device and that the roll is always at an effective stitching angle in respect to the bead portion.

Having thus described my invention, I claim:

1. A device for forming material around and under the bead portion of a tire supported and rotated by a tire building drum arched adjacent the bead, which comprises a flanged stitching roll mounted for movement so that the contacting point of the flange of the roll describes an arc around the bead portion, the center of which lies outside the bead portion and the plane of the flange being substantially tangent to the said arc and means operable to move the roll bodily in an axial plane of the drum, said bodily movement being variable with respect to the arcuate movement.

2. A device for forming material around and under the bead portion of a tire carcass supported on a tire building drum, which comprises a flanged stitching roll mounted for vertical movement adjacent the bead in a substantially axial plane of the drum and in an arc passing through the plane of the bead portion, the plane of the flange of the roll being substantially tangent to the arc described by the contacting point of the flange and means for simultaneously imparting the said movements to the roll.

3. A device for forming material around and under the bead portions of a tire carcass while the latter is supported on a rotatable drum which is arched adjacent the beads, comprising arms mounted for movement substantially radially toward and from the axis of the drum in planes parallel to and adjacent the planes of the bead portions, means to rotate said arms about axes lying in said planes and rotatable discs so mounted on the arms that said discs will describe arcs passing through the planes of the bead portions and means to simultaneously rotate the arms on their axes and move them radially toward and from the axis of the drum.

4. A device for forming material around and under the bead portion of a tire carcass while the latter is supported on a rotatable drum which is arched adjacent the beads, comprising a longitudinally rotatable arm pivoted at one end to permit movement of its free end substantially radially toward and from the axis of the drum in a plane parallel to and adjacent the plane of the bead supporting portion of the drum, a freely rotatable disc mounted on the free end of the arm, the axis of the disc making an angle of substantially 93° with the axis of the arm in the direction of rotation of the drum and means to simultaneously rotate the arm about its axis and swing it about its pivot.

CHARLES H. DESAUTELS.